Dec. 4, 1928.　　　　　　　　　　　　　　　　1,694,198
G. W. YANSS
AUTOMOBILE FENDER GUARD
Filed Sept. 15, 1925　　　3 Sheets-Sheet 1
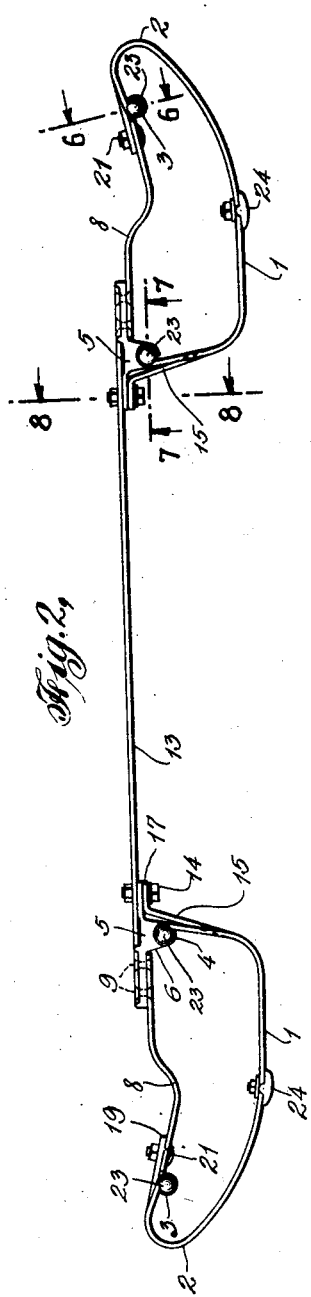
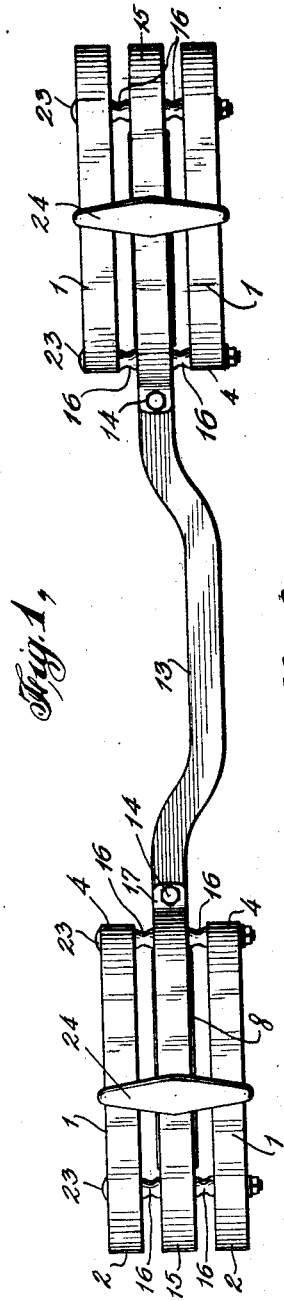
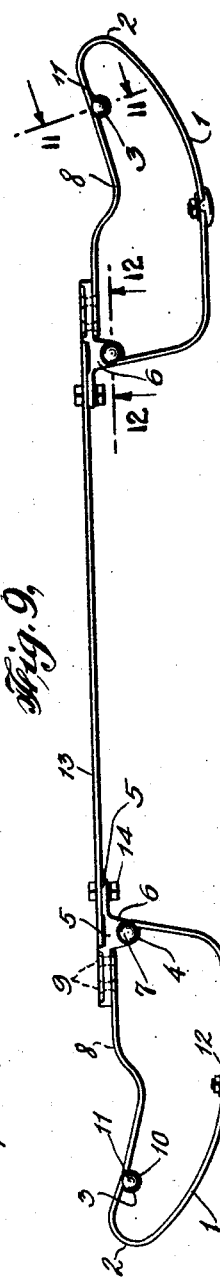
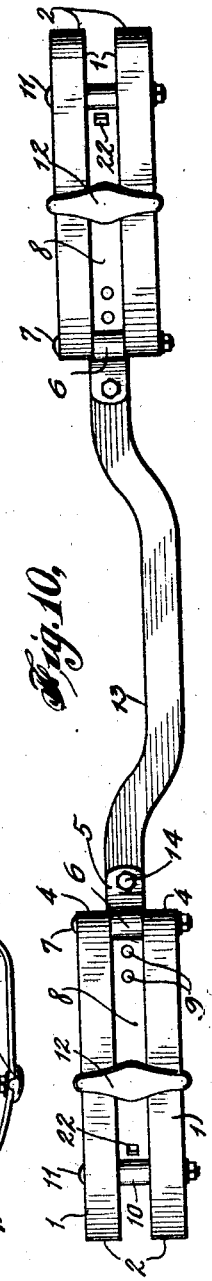
INVENTOR
George W. Yanss
BY
Frederick S. Duncan ATTORNEY

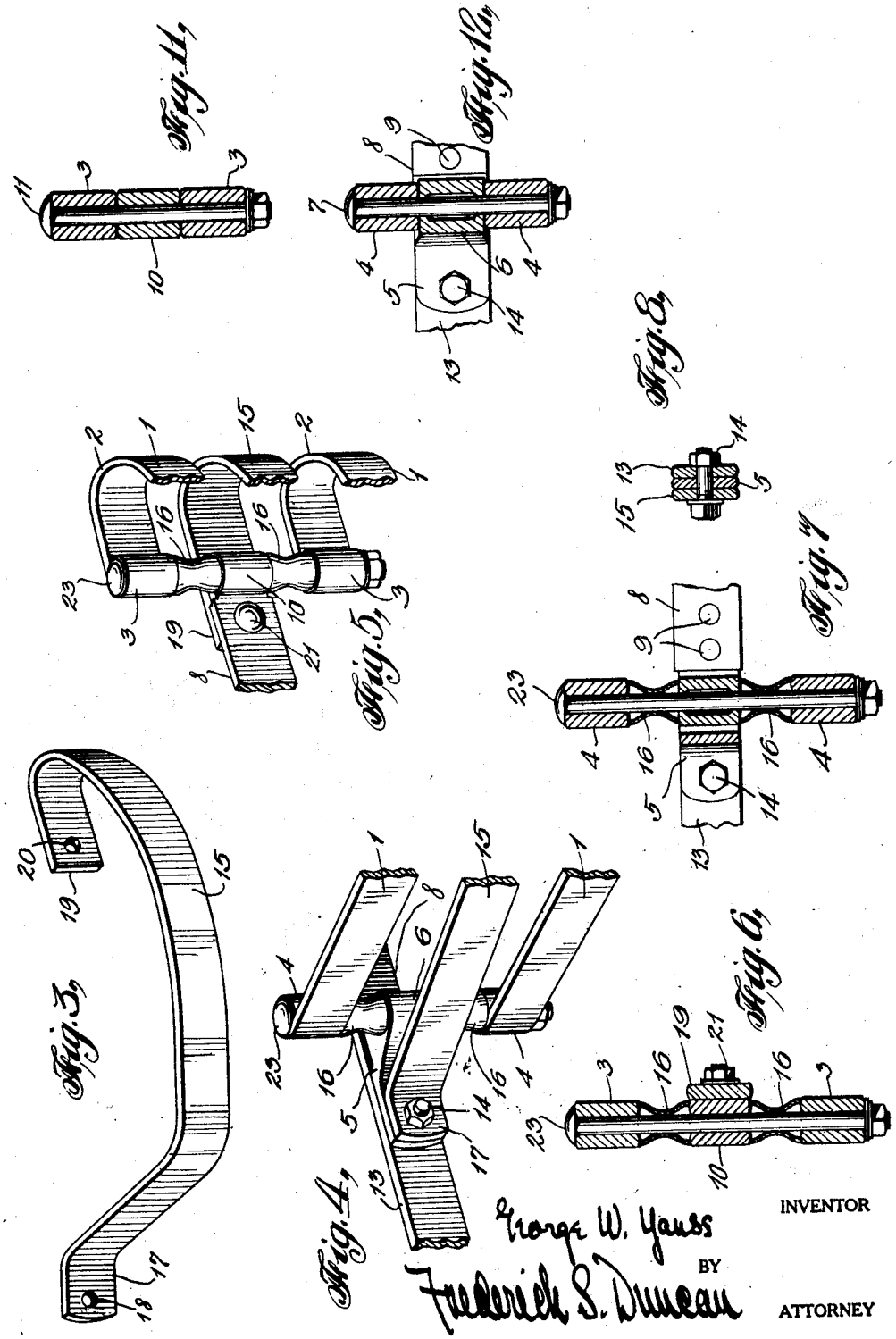

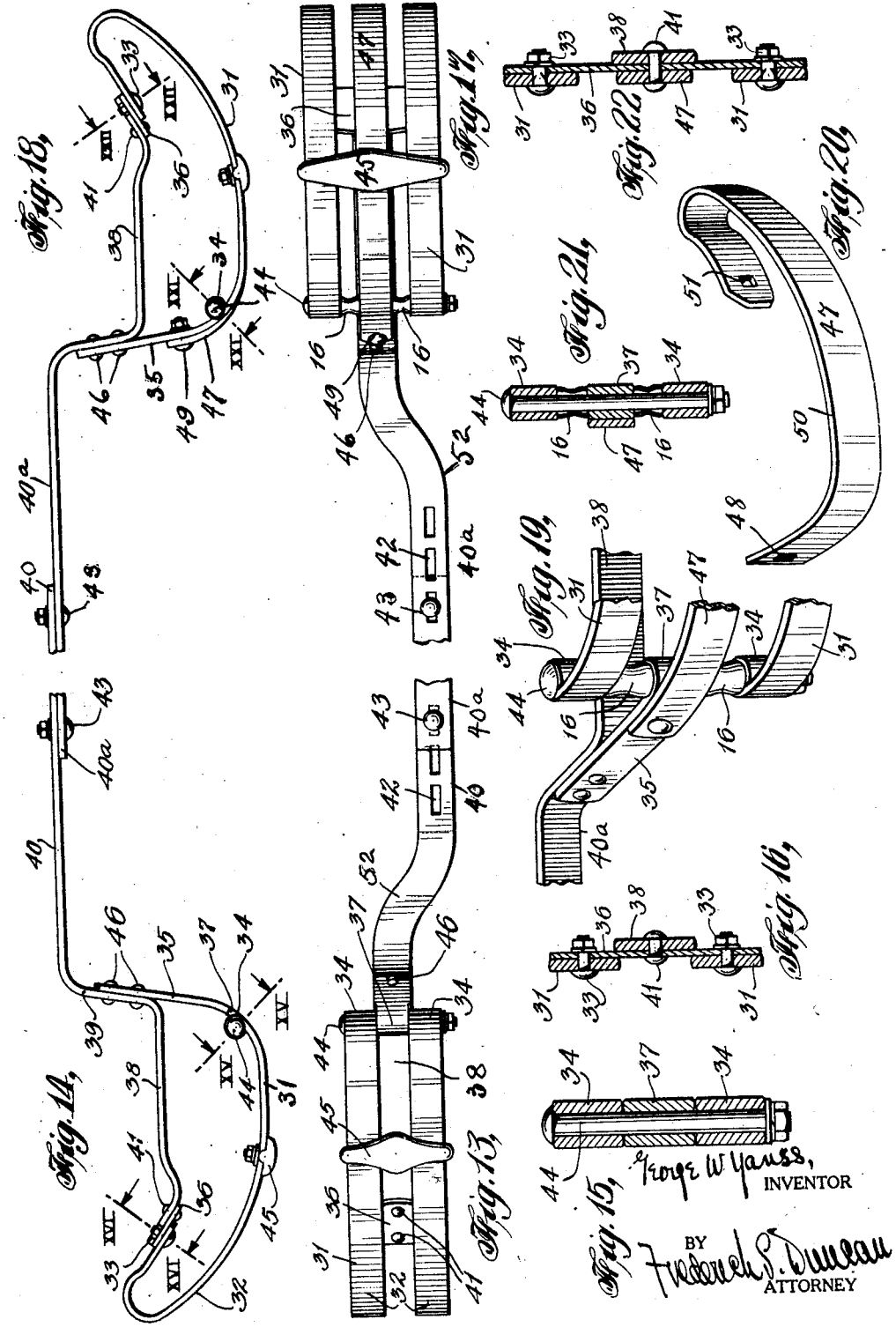

Patented Dec. 4, 1928.

1,694,198

UNITED STATES PATENT OFFICE.

GEORGE W. YANSS, OF BRIDGEPORT, CONNECTICUT, ASSIGNOR TO AMERICAN CHAIN COMPANY, INC., A CORPORATION OF NEW YORK.

AUTOMOBILE FENDER GUARD.

Application filed September 15, 1925. Serial No 56,416.

This invention relates to bumpers for automobiles and is of particular utility when employed in the construction of bumpers of the type known as fender-guards.

An important object of the invention is to provide a structure adapted to support two or more main impact bars interchangeably, the improved supporting structure herein disclosed permitting the assembly therewith of a fender-guard having say two bars or three bars, using the same main elements, a three-bar guard requiring no change of the basic structure, as compared with a two-bar guard, and only requiring the provision of an auxiliary main impact bar or bars, with such minor additional elements as spacing devices and cross-ties, of proper size and standard form.

Among other objects of the invention is the provision of elements which are not only interchangeable in the assembly of fender guards having two or more main bars, but which are also capable of use interchangeably on a fender guard at either side of an automobile; and also the provision of a back bar to each end of which can be secured a complete fender guard having the desired number of main impact bars, the back-bar being desirably made in two parts, to permit transverse adjustment.

In the drawings,

Fig. 1 is a front elevation of a three bar fender guard embodying the invention.

Fig. 2 is a plan view thereof.

Fig. 3 is a detail view in perspective of an auxiliary main bar, isolated, on a larger scale.

Fig. 4 is a fragmentary detail view in perspective of one of the pivot joints comprising a supporting bracket and its associated parts.

Fig. 5 is a similar view of the pivotal joint at the outer end of the three-bar guard.

Fig. 6 is a vertical section on the line 6—6 of Fig. 2.

Fig. 7 is a vertical section on the line 7—7.

Fig. 8 is a vertical section on the line 8—8.

Fig. 9 is a plan view of a two-bar fender guard.

Fig. 10 is a front elevation thereof.

Fig. 11 is a vertical section on the line 11—11 of Fig. 9.

Fig. 12 is a vertical section on the line 12—12.

Fig. 13 is a view in elevation of a modified form of two bar fender guard.

Fig. 14 is a plan view of the same.

Fig. 15 is a view in vertical section on the line XV—XV of Fig. 14.

Fig. 16 is a view in vertical section on the line XVI—XVI.

Fig. 17 is a view in elevation of a modified form of three bar fender guard.

Fig. 18 is a plan view thereof.

Fig. 19 is a fragmentary detail view in perspective on an enlarged scale, of the pivot point of Fig. 17.

Fig. 20 is a view in perspective of the auxiliary main bar of Fig. 17, on an enlarged scale.

Fig. 21 is a vertical, sectional view on the line XXI—XXI of Fig. 18.

Fig. 22 is a vertical section on the line XXII—XXII.

In the illustrated embodiment, referring first to the structure shown in Figs. 9 to 12, a fender-guard is shown comprising two sets of fender guard members, each set having a pair of main impact bars designated respectively by the reference character 1, formed respectively of flat strips of steel preferably bent upon themselves as illustrated to form loops 2 having terminal eyes at 3 on their outer ends and similar terminal eyes 4 at their inner ends.

Each pair of these main impact bars derives its support from a bracket 5 adapted to be secured to an automobile, and having an apertured lug 6 through which extends a bolt 7, the lug having a bolt-hole registering with the eyes 4, which are transfixed by the bolt 7, and thereby secured pivotally to the bracket 5.

Each bracket is also shown as provided with an extension or part 8, preferably formed separately as a supporting member of flat steel secured suitably to the bracket 5, as by rivets 9, and having a terminal eye 10 extending into position to register with the eyes 3 and 10, and adapted to receive a cross-tie bolt 11, which serves to connect the impact bars pivotally with the extension member 8. The impact bars are spaced in vertical relation at their outer ends by the eye 10, and at their inner ends by the lug 6, and are preferably clamped together at their impact portions by suitable devices such as the clamps 12, which serve as cross-ties.

Preferably the sets of impact bars are connected with each other by a back bar 13 adapted to extend across the rear of an automobile, to which the same may be secured by any suitable means, not shown.

Suitable means are provided to connect the brackets with the back bar 13, for which purpose the rivets 9 are shown as extending through the back bar as well as through the brackets and parts 8, and at 14 I have shown bolts which serve the same purpose and also are available for use in adapting the elements already described for use in the formation of a three bar bumper, such as that shown in Figs. 1 to 8.

To convert the two bar guard into such a three bar guard, the main impact bars 1 are spread apart and a third main bar, designated by the reference character 15, is positioned therebetween, serving as an auxiliary main impact bar in combination with the upper and lower bars 1, which are preferably identical in structure with those already described, and bear the same reference characters for similar parts. In order to maintain the main impact bars 1 at the proper distance for such use, suitable spacer devices are provided, which may conveniently take the form of spools 16, interposed between the bracket lugs 6 and eyes 4 at the inner ends of the impact bars, and also between the eye 10 of the extension member 8 and the eyes 3 at the outer ends of the impact bars.

The auxiliary bar 15 may be of any suitable shape and material, and secured by any suitable means in assembled relation with the parts heretofore described, and as a now preferred form of auxiliary main impact bar, the drawing illustrates such a bar as taking the form shown in detail in Fig. 3, comprising a flat strip of steel, the impact portion of which is indicated at 15 as conforming closely in contour to that of the main bars 1. To provide for securing this auxiliary impact bar in assembled relation it is shown as having at its inner end 17 a bolt-hole 18, through which the bolt 14 already described may be extended, securing the inner end of the auxiliary bar in assembled relation with the bracket lug 6 and back bar 13. The outer end 19 of the auxiliary impact bar is shown as having a bolt-hole 20 to receive a bolt 21, which extends through a bolt-hole 22 provided for that purpose near the outer end of the bracket extension member 8 (Figs. 2, 3 and 10).

It will thus be seen that the three bar bumper is composed of the same elements as the two bar bumper already described, including a pair of main impact bars 1 at each end, fitted to the same bracket 5 and back bar 13, the only additional structure required consisting of the auxiliary bars 15, the spacing spools 16, and bolts 21, it being understood that connecting bolts 23 of suitable length will be supplied, where required, these being of standard form, and not requiring special structure, and finally clamps 24 of suitable standard form and length will preferably be used.

The various parts are of simple and inexpensive structure, and their interchangeable character permits the manufacturer to supply from stock a considerable variety of fender-guards without the maintenance in stock of complete fender-guards of the three bar type in addition to those of the two bar type, the arrangements described also having the advantage of permitting considerable tolerance in manufacture and assembly of the parts.

Dealers in bumpers can also supply to individual customers the parts required for either a two bar bumper or a three bar bumper, and it is feasible for an individual user to convert a two bar guard into a three bar guard by purchasing and assembling the additional parts required, no special tools or mechanical skill being required to effect such a conversion.

Any main bar 1 may be used, on either side of the automobile, in any of the four positions designated by the reference character 1, in the assembly of either a two bar fender guard or a three bar guard, and the auxiliary bars 15 are likewise interchangeable, side for side, and the assembled fender guard, whether of the two bar type or the three bar type, may be turned end over end, from the position shown in Figs. 1 and 10 respectively, to cause the offset portion 13 of the back bar to extend upwardly instead of downwardly, when the fender guard is installed.

It is to be understood, of course, that the back bar 13 may be straight, instead of being offset, and that in general such changes in contour, material and arrangement of parts as may desirably meet the exigencies of particular installations, may be made without departing from the invention.

In Figs. 13 to 22 inclusive is illustrated a modified form of fender guard of the above described convertible type which may be made up either as a two bar fender guard or as a three bar fender guard, in the following manner.

In Figs. 13 to 16 inclusive is shown a set of parts of a two bar fender guard as they appear when ready for attachment to the left-hand rear side of an automobile frame, and it will be understood that a similar set of identical construction will be used for the right hand side of the automobile, so that the following description applies equally to each of such sets. The parts are interchangeable, side for side except as hereinafter noted.

Each set for such a two bar fender guard has a pair of main impact bars designated respectively by the reference numerals 31, and each main bar is formed of a flat strip of steel preferably bent upon itself as illustrated to form a loop 32 having a terminal eye at 34 at its inner end and having at its outer end bolted connections 33 with a cross-tie member, preferably in the form of a plate 36 which is supported by a similar riveted or bolted connection 41 with a rear bar member 38, the latter being bent rearwardly at 39 and then extended in substantially parallel continuation at 40 to form a part which may be attached to the rear of an automobile frame by any suitable means, not shown. It is to be noted that where a similar member 40ª is provided to extend toward the right hand side of an automobile, provision will preferably be made for connecting these two members adjustably, as by means of the slots 42 and bolts 43 shown in Figs. 13 and 14. It is also to be understood that if desired, the member 40 may be extended itself to the right hand side of an automobile, there to receive a duplicate set of the parts of a fender guard, like those described above.

I have shown at 35 a member riveted at 46 to the bent portion 39 of the rear bar and serving as a forward extension or bracket to support the eyes 34 at the inner ends of the main bars 31, this bracket having formed therein an eye 37 which is transfixed by a bolt 44 which also passes through the eyes 34, serving as a pivotal cross-tie or hinge to connect the eyes 34 pivotally with each other and with the bracket-eye 37.

The main bars are preferably connected further by a cross-tie taking the form of a clamp 45, and the fender guard thus constructed constitutes an extremely strong, light, and rigid fender guard device, having, however, a certain amount of flexibility under heavy impacts, which tend to bend the member 38 rearwardly, turning the fender guard as a whole around the pivot bolt 44.

Referring now to Figs. 17 to 22 inclusive, suitable means are shown by which the two-bar guard illustrated in Figs. 13 to 16 may be converted into a three-bar guard, a set comprising the assembled parts for the latter being shown in elevation in Fig. 17 and in plan in Fig. 18.

To convert the two bar guard into such a three bar guard, the main impact bars 31 are spread apart and a third main bar, designated by the reference character 47, is positioned therebetween, serving as an auxiliary main impact bar in combination with the upper and lower bars 31 which are preferably identical in construction with those already described, and bear the same reference characters for similar parts. In order to maintain the main impact bars 31 at the proper distance for such use, suitable spacer devices are provided which may conveniently take the form of spools 16 interposed between the eye 37 of the bracket 35 and the eyes 34 upon the inner ends of the main impact bars, a bolt 44 transfixing the eyes 34 and 37 and the spools 16, thus forming a cross-tie constituting a pivot joint similar to that shown and described with reference to Fig. 15.

The auxiliary bar 47 may be of any suitable shape and material and secured by any suitable means in assembled relation with the parts heretofore described, and as a preferred form of auxiliary main impact bar, the drawing illustrates such a bar as taking the form shown in detail in Fig. 20, comprising a flat strip of steel, the impact portion of which is indicated at 50 as conforming closely in contour with that of the main bars 31.

To provide for securing this auxiliary impact bar in assembled relation, it is shown as having at its inner end a bolt hole 48, through which a bolt 49 may be extended, securing the inner end of the auxiliary bar in assembled relation with the bracket 35, and the outer end of the auxiliary impact bar is shown as having a rivet hole 51 to receive a rivet 41 which connects the auxiliary impact bar with a cross-tie plate 36 similar to that described with reference to Figs. 13, 14 and 16, but of suitably greater length, the cross-tie being shown as bolted at 33 to the main impact bars.

Accordingly, by the simple provision of the auxiliary bar 47 with spacers 16 and cross-tie members of suitable length, including a pivot bolt 44, a tie-plate 36 and a clamp 45, the three-bar guard may be easily developed from the members of the two-bar guard already described.

The main bars 31 may be used interchangeably in each pair and at either side of the automobile, and where the rear bar is formed of two adjustably connected members 40 and 40ª, having edge-bent offset portions, as shown at 52, these rear-bar members will preferably be of symmetrical formation, so that by turning the rear-bar thus formed end over end the middle offset portion may be caused to project upwardly instead of downwardly without any change of structure.

Having described my invention, I claim:

1. An automobile fender-guard comprising as elements a pair of main impact bars superimposed in vertical relation; a support for said impact bars comprising a bracket adapted to be attached to an automobile and having connecting means for the inner ends of said impact bars, and also having an extension part provided with connecting means for the outer ends of said impact bars; said bracket being adapted to support also an auxiliary impact bar.

2. An automobile fender-guard comprising as elements a pair of main impact bars superimposed in vertical relation; a support for said impact bars comprising a bracket adapted to be attached to an automobile and having connecting means for the inner ends of said impact bars, and also having an extension part provided with connecting means for the outer ends of said impact bars; said bracket being adapted to support also an auxiliary impact bar connected with said bracket and extension part respectively, being positioned between said main bars, and spacing devices associated with said connecting means to separate said main bars in vertical relation.

3. An automobile fender-guard comprising as elements a plurality of main impact bars superimposed in vertical relation and having eyes at their inner ends respectively; a support for said impact bars comprising a member adapted to be supported by an automobile and having a bolt-hole registering with said eyes at the inner ends of said impact bars, and also having an extension provided with a cross-tie connecting the outer ends of said impact bars; and a connecting bolt transfixing said eyes and bolt-hole.

4. An automobile fender-guard comprising as elements a plurality of main impact bars superimposed in vertical relation and having eyes at their inner ends respectively; a support for said impact bars comprising a member adapted to be supported by an automobile and having a part provided with a bolt-hole registering with said eyes at the inner ends of said impact bars, and having a bolt transfixing said eyes and bolt-hole, said member also having an extension provided with a cross-tie connecting the outer ends of said impact bars.

5. An automobile fender-guard comprising as elements a plurality of main impact bars superimposed in vertical relation and having eyes at their inner ends respectively; a support for said impact bars comprising a member adapted to be supported by an automobile and having a part provided with a bolt-hole registering with said eyes at the inner ends of said impact members, said supporting member also having an extension part provided with a cross-tie adapted to connect the outer ends of said impact bars; and a connecting bolt transfixing said eyes and bolt-hole respectively, said bracket and its extension being respectively provided with other bolt-holes to receive bolts serving to attach thereto an auxiliary main impact bar interposed in vertical arrangement between the impact bars of said pair, the latter being spaced apart, suitably for said interposition, by spacing devices associated with said connecting bolts at the several regions between said eyes and the bracket and its extension.

6. An automobile fender-guard comprising as elements a pair of main impact bars of flat metal superimposed edgewise in vertical relation and having eyes at their inner ends respectively; a support for said impact bars comprising a rear bar adapted to be supported by an automobile and having a bracket provided with a bolt-hole registering with said eyes at the inner ends of said impact members, and also having an extension part adapted to support a cross-plate to connect the outer ends of said impact bars; a connecting bolt transfixing said inner eyes and bolt-hole respectively, and a connecting-plate for said outer ends, said bracket and extension part being respectively provided with apertures to receive devices serving to attach thereto an auxiliary main impact bar of flat metal interposed in vertical arrangement between the impact bars of said pair, the latter being spaced apart, suitably for said interposition, by spacing devices associated with said connecting means at the several regions of connection between said bars and the bracket and extension part respectively.

In testimony whereof, I have signed this specification.

GEORGE W. YANSS.